(12) United States Patent
Venezzio, Jr.

(10) Patent No.: US 7,052,524 B1
(45) Date of Patent: May 30, 2006

(54) FAN MOUNTED AIR PURIFIER

(76) Inventor: Albert D. Venezzio, Jr., 115 Dittmar Dr., South Toms River, NJ (US) 08757

( * ) Notice: Subject to any disclaimer, the term of this patent is extended or adjusted under 35 U.S.C. 154(b) by 75 days.

(21) Appl. No.: 10/840,077

(22) Filed: May 6, 2004

(51) Int. Cl.
*B01D 46/54* (2006.01)
*B03H 1/00* (2006.01)

(52) U.S. Cl. .............. 55/385.1; 95/78; 96/63; 416/5; 416/62; 416/146 R; 422/121; 422/122; 422/123; 422/124

(58) Field of Classification Search .............. 55/385.1; 95/78; 96/63; 416/5, 62, 146 R; 422/121–124
See application file for complete search history.

(56) References Cited

U.S. PATENT DOCUMENTS

| | | | |
|---|---|---|---|
| 4,422,824 A * | 12/1983 | Eisenhardt, Jr. ............... | 416/5 |
| 4,676,721 A | 6/1987 | Hardee | |
| 4,753,573 A * | 6/1988 | McKnight ..................... | 416/62 |
| 4,840,650 A * | 6/1989 | Matherne ..................... | 55/385.1 |
| 4,889,543 A | 12/1989 | Burt | |
| 5,341,565 A | 8/1994 | Kuryliw | |
| 5,370,721 A | 12/1994 | Carnahan | |
| 5,564,900 A * | 10/1996 | McAuley ..................... | 416/62 |
| 5,775,876 A * | 7/1998 | Walker et al. ................ | 416/62 |
| 5,795,131 A | 8/1998 | Crowhurst | |
| 6,779,976 B1 * | 8/2004 | Carfagna et al. .............. | 416/5 |
| 6,790,004 B1 * | 9/2004 | Steinheiser .................. | 416/65 |

* cited by examiner

*Primary Examiner*—Minh-Chau T. Pham
(74) *Attorney, Agent, or Firm*—Michael R. Philips

(57) ABSTRACT

An air purifier is provided for mounting to a leading edge of a fan paddle so that equal, mirror-image portions reside above and below the fan paddle. The air purifier is formed with a synthetic fiber filter medium assembled to a lattice framework. Adhesive tape strips are positioned on the framework for mounting the air purifier to the fan paddle.

17 Claims, 2 Drawing Sheets

FAN MOUNTED AIR PURIFIER

FIELD OF THE INVENTION

The present invention relates to the field of air filtration apparatus, and more particularly to air filters that are adapted for mounting on a paddle of a fan.

BACKGROUND OF THE INVENTION

The use of ceiling mounted fans, also referred to as paddle fans, is popular both in summer and in winter to circulate the air in a home or commercial environment to improve the comfort of individuals in that environment. There are two basic principles involving the use of ceiling fans:

(1) moving the air in a room averages the temperature between the warm air that ordinarily rises to the ceiling and cooler air that remains at a lower level, and (2) improving the air flow to more effectively cool or warm people in the room.

The ceiling fan comes into contact with a large volume of air while performing its functions, and with that air, a quantity of particles that are suspended in the air. These particles can be dust, soot, smoke or industrial residue, among others. In some cases the particles are merely a nuisance, but in others, the particles can cause eye and/or skin irritation, illness or contamination of supposedly clean work areas.

This airborne particle problem has been addressed several times in the past with respect to fans, as disclosed in U.S. Pat. No. 4,676,721 for a Room Air Cleaner; U.S. Pat. No. 4,753,573 for Filtering Means For Ceiling Fan Blades; U.S. Pat. No. 4,840,650 for a Ceiling Fan Filter; U.S. Pat. No. 4,889,543 for an Air Filtering System; U.S. Pat. No. 5,341,565 for a Method Of Securing A Filter Element To A Blade Of A Fan; U.S. Pat. No. 5,370,721 for a Ceiling Fan Filter; and U.S. Pat. No. 5,795,131 for a Fan Air Cleaner.

In particular, the '650 patent involves an invention with a filter housing that is configured for being connected to a leading edge of a ceiling fan blade. The filter housing has an air entrance and an air exit and air channeling vanes for guiding air into the housing. An air filtering medium is placed within the housing and the housing is mounted to reside above the leading edge of a ceiling fan blade. While the '650 patent provides certain of the characteristics of the present invention, the present invention Fan Mounted Air Purifier provides distinguishing features that achieve a simpler and more effective means for removal of particles from the air than disclosed in the prior art.

SUMMARY OF THE INVENTION

The air purifier of the present invention is formed of a filter medium and a backing. The filter medium is a fibrous sheet material having a first side with a relatively irregular surface and a second side with a relatively regular surface. The backing is an open, lattice-like framework to which the filter medium is affixed with the relatively regular surface in contact with the framework. The backing is made of a material that is easily bent to a desired shape and retains the shape to which it is bent. A preferred air purifier is bent to a cross sectional shape with four planar panels connected to one another at common edges to form a letter "W." An adhesive strip is mounted to a rear side of the backing for attaching the air purifier to a leading edge of a ceiling fan paddle.

BRIEF DESCRIPTION OF THE DRAWINGS

The present invention is best understood in conjunction with the accompanying drawing figures in which like elements are identified by similar reference numerals and wherein.

DETAILED DESCRIPTION OF THE PREFERRED EMBODIMENT

Figure 1:
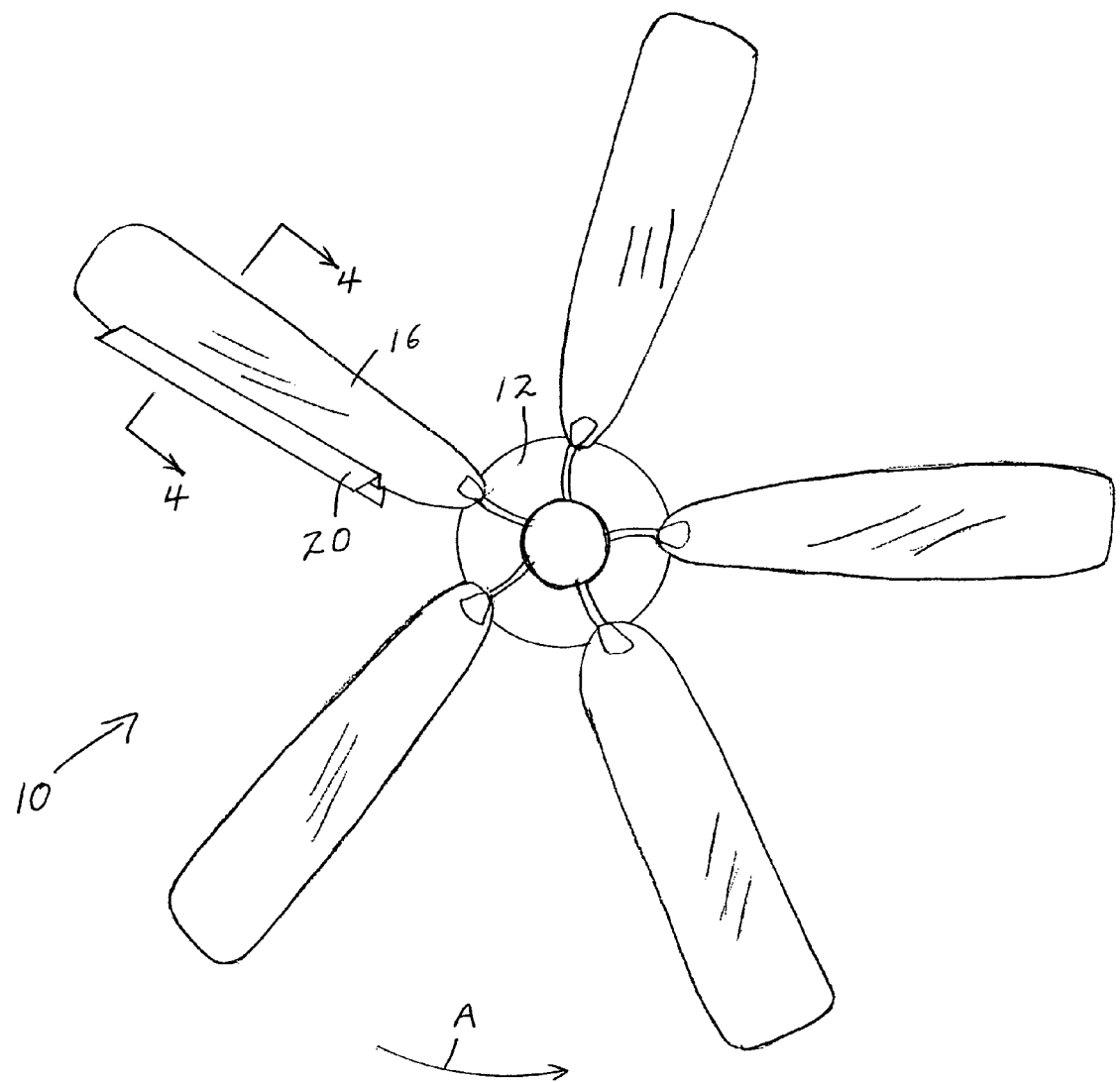
FIG. 1 is a bottom perspective view of a ceiling fan to which the air purifier of the present invention is mounted.

Referring now to FIG. 1, a typical five-paddle fan 10 is shown mounted to a ceiling in bottom perspective view. Fan 10 comprises paddles 16 that are driven rotationally by a motor 12 in the direction indicated by arrow A. Air purifier 20 is mounted to the leading edge of a selected paddle 16 so that suspended particles and contaminants in the air impinge, and are captured by, air purifier 20 as fan 10 rotates. It is known to reverse the rotational direction of fan 10 to change from an up flow to a down flow; if such a change in rotation and relative airflow is made, air purifier 20 is mounted on the opposite edge of fan paddle 16. In some applications, air purifiers may be used on two or more paddles 16 to increase the effectiveness of air purification. While a ceiling fan is used as way of example, pedestal-mounted fans are similarly benefited by the present invention.

Figure 2:
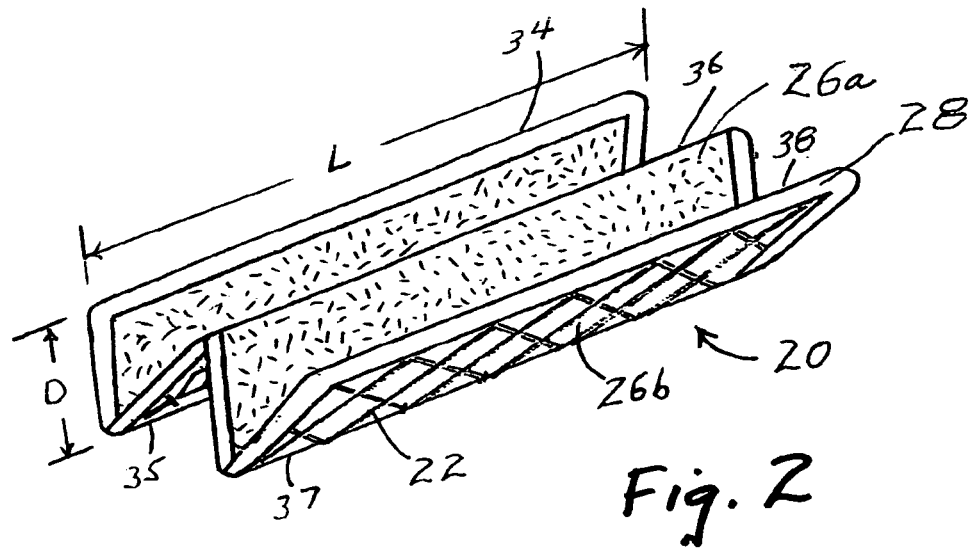
FIG. 2 is a perspective view of the air purifier of the present invention showing the particle receiving irregular surface thereof.

Referring now to FIG. 2, air purifier 20 is illustrated as a rectangular composite sheet of laminated materials that is bent to appear as four substantially planar rectangular panels to form a symmetrical array having the cross sectional shape of a "W." Air purifier 20 has peaks 34, 36, 38, with troughs 35, 37 formed between each pair of adjacent peaks. In practice, it has been found that a width D of approximately 2.5 cm (1.0 inch) wide by a length L of approximately 40 cm (16 inches) long is appropriate for use with a common sized ceiling fan having paddles of approximately 50 cm (20 inches) long by 12.5 cm (5 inches) wide. Therefore, the width of the laminated sheet of backing and filter medium material, prior to forming the preferred "W" shape, is approximately 10 cm (4 inches). As shown, the angles of the four panels of air purifier 20 with respect to a vertical line make a symmetrical mirror-image cross section.

Backing framework 22 is formed as a self-supporting lattice having openings that are substantially larger in area than the separating struts forming the lattice. The openings allow a free flow of air therethrough as fan 10 rotates. A suitable material is soft iron wire mesh. Alternatively, backing 22 may be formed of molded plastic or of wooden bars, e.g. rattan, according to the intent of the designer. In a case where wire is used, and forming the wire lattice to the intended size results in cut wire ends, an edge protector 28 is applied to avoid damage from bare cut wire ends. A suitable material for edge protector 28 is an adhesive-backed tape that is folded across the wire edges.

A filter medium 26 is affixed to cover the entire area of backing 22. Filter medium 26 may be formed of any material able to withstand air pressure generated by the operation of a rotating fan and porous in structure. Many materials are known to serve as filters for the removal of particles from air, including fiber glass mat, metal mesh, porous paper, and non-woven fiber sheets. A suitable material for filter medium 26 is a fibrous mat, formed as a non-woven sheet, e.g. of synthetic fibers, having a first side 26a with a relatively irregular surface and a second side 26b with a relatively regular surface. First side 26a is preferably mounted to reside away from backing 22 and thus to be impinged by air as fan 10 rotates. The randomly-laid, irregular surface fibers form a bed to which particles in the air adhere. A further enhancement of the attraction and adhesion of the particles to the filter medium first side 26a is achieved by an electrostatic effect of the synthetic fibers utilized. A known sheet material with a lattice and non-woven filter medium for the formation of air purifier 20 is an air filter distributed by American Air Filter International.

Figure 3:
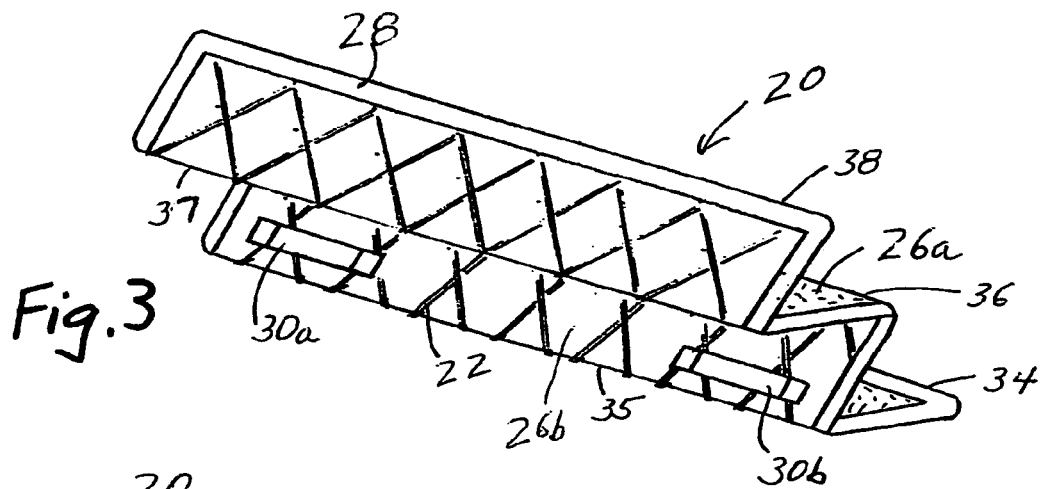
FIG. 3 is a perspective view of the air purifier of the present invention showing the rear regular surface thereof.

Referring now to FIG. 3, in the preferred embodiment of the invention, air purifier 20 is provided with attachment means 30a, 30b for assembly to the leading edge of fan paddle 16 (see FIG. 1). Attachment means 30a, 30b are assembled to the second side of air purifier 20 on the two panels 35–36 and 36–37. As illustrated, attachment means 30a, 30b comprise strips of pressure sensitive adhesive tape extending a fraction of the length of each panel. Full length tape strips or an adhesive compound applied directly to the back sides of panels 35–36 and 36–37 may be similarly used.

Figure 4:
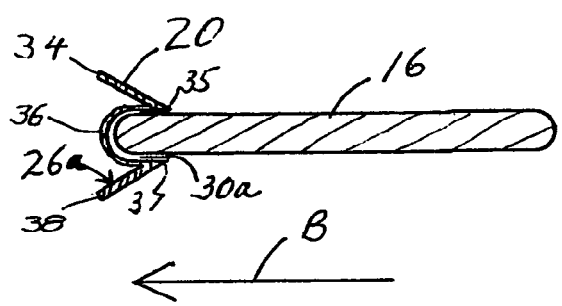
FIG. 4 is a cross sectional view taken in the direction of line 4—4 of FIG. 1.

Referring now to FIG. 4, a cross sectional view is shown of fan paddle 16 rotating in the direction indicated by arrow B with air purifier 20 mounted thereto. According to the principles of the invention, air purifier 20 mounts so that a pair of mirror-image sections 34, 35, 36 and 36, 37, 38 reside symmetrically on either side of the edge of fan paddle 16. The symmetrical form of air purifier 20, as mounted on the leading edge of fan paddle 16, equalizes the force of air against the front surface of air purifier 20, thus optimizing captured air flow and keeping air purifier 20 securely mounted. In the process of mounting air purifier 20 with adhesive attachment means 30a, 30b, peak 36 conforms to the underlying contour of the leading edge of paddle 16. Air purifier 20 is mounted in a direction so that peaks 34, 36, 38 extend in advance of the leading edge of paddle 16 so that particles in the air are encountered by first side 26a of filter medium 26, entrapping air particles and leaving the environment cleaner.

As air purifier 20 captures airborne particles, the pores in filter medium 26 become gradually filled. As with all filter media, at some point sufficient accumulation of particles has occurred to prevent adequate air flow through the medium to continue the entrapment of particles. Depending on the color of the captured particles and the color of filter medium 26, this particle accumulation may cause the surface to appear dirty. The amount of fan operating time for such saturation will differ with conditions. When air purifier 20 is dirty, replacement of a new air purifier 20 is readily done by stripping old air purifier 20 from fan paddle 16 and mounting a new air purifier 20 in its place.

As disclosed above and according to the claims below, the fan mounted air purifier provides the useful functions of removing particles, soot, and pollen from the air and leaving a cleaner environment. In addition, the air purifier can be infused with a pleasant scent to overcome objectionable odors in the air. The air purifier is useful in homes, offices, stores, restaurants and factories, among other places.

While the description above discloses preferred embodiments of the present invention, it is contemplated that numerous variations and modifications of the invention are possible and are considered to be within the scope of the claims that follow.

What is claimed is:

1. An air purifier for mounting to a leading edge of a fan paddle, comprising:
    a. a self-supporting lattice framework having a plurality of openings therethrough and configured in cross section substantially as a symmetrical array of connected panels;
    b. a filter medium assembled to substantially cover one surface of the framework; and
    c. means on the framework for releasably mounting the assembled filter medium and framework to a leading edge of a fan paddle with opposed portions extending outwardly of the fan paddle in symmetrical relation thereto.

2. The air purifier described in claim 1, wherein the framework is formed of a material that retains a shape to which it is bent.

3. The air purifier described in claim 1, wherein the filter medium has a first surface that is substantially irregular.

4. The air purifier described in claim 3, wherein the filter medium has a second surface that is relatively regular.

5. The air purifier described in claim 4, wherein the air purifier is assembled with the second surface of the filter medium in contact with the framework.

6. The air purifier described in claim 1, wherein the framework is mounted so that substantially mirror image portions thereof extend above and below a fan paddle edge to which the air purifier is mounted.

7. The air purifier described in claim 1, further comprising an edge protector assembled to cover edges of the framework.

8. The fan mounted air purifier described in claim 1, wherein the filter medium is formed of synthetic fibers.

9. The air purifier described in claim 8, wherein the filter medium is a non-woven fibrous sheet.

10. A fan mounted air purifier, comprising:
    a. a filter medium;
    b. a perforate backing framework connected to the filter medium, the combination having a cross section formed as a plurality of angularly oriented planar panels connected to one another at common edges; and
    c. means mounted to the backing framework and filter medium adapted to mount the air purifier to straddle a leading edge of a fan paddle so that equal portions of the air purifier extend outwardly of either side of the fan paddle edge.

11. The fan mounted air purifier described in claim 10, wherein the backing framework comprises four panels.

12. The fan mounted air purifier described in claim 10, wherein the means to connect the air purifier to straddle a leading edge of a fan paddle comprises adhesive means.

13. The fan mounted air purifier described in claim 12, wherein the adhesive means comprises pressure sensitive adhesive tape.

14. The fan mounted air purifier described in claim 10, wherein the filter medium has one side configured to entrap particles in the ambient air.

15. The fan mounted air purifier described in claim 10, wherein the filter medium is electrostatically charged.

16. The fan mounted air purifier described in claim 10, wherein the filter medium comprises a non-woven fabric.

17. The fan mounted air purifier described in claim 11, wherein the framework panels form two troughs bordered by three peaks, with a central peak engaging the fan paddle edge.

* * * * *